United States Patent
Shibata et al.

(10) Patent No.: US 10,113,702 B2
(45) Date of Patent: Oct. 30, 2018

(54) VEHICLE LIGHTING APPARATUS

(71) Applicant: KOITO MANUFACTURING CO., LTD., Tokyo (JP)

(72) Inventors: Hiroki Shibata, Shizuoka (JP); Takashi Inoue, Shizuoka (JP); Masashi Tatsukawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 636 days.

(21) Appl. No.: 14/095,168

(22) Filed: Dec. 3, 2013

(65) Prior Publication Data
US 2014/0153274 A1    Jun. 5, 2014

(30) Foreign Application Priority Data

Dec. 4, 2012   (JP) ................................ 2012-265542
Feb. 21, 2013  (JP) ................................ 2013-032310

(51) Int. Cl.
*B60Q 1/00*    (2006.01)
*F21S 41/00*   (2018.01)
(Continued)

(52) U.S. Cl.
CPC ............ *F21S 41/00* (2018.01); *B60Q 1/0683* (2013.01); *B60Q 1/076* (2013.01); *F21S 41/147* (2018.01);
(Continued)

(58) Field of Classification Search
CPC ..... B60Q 1/0683; B60Q 1/076; F21S 48/321; F21S 48/328; F21S 48/1159;
(Continued)

(56) References Cited

U.S. PATENT DOCUMENTS 5,113,330 A  *  5/1992  Makita ................... B60Q 1/007
                                                  362/265
5,735,656 A     4/1998  Marvell et al.
(Continued)

FOREIGN PATENT DOCUMENTS

CN        101363584 A    2/2009
CN        102734727 A    10/2012
(Continued)

OTHER PUBLICATIONS

Tanaka, Vehicular Lighting Fixture, Nov. 5, 2009, JP2009259654A, English.*
(Continued)

*Primary Examiner* — Bryon T Gyllstrom
*Assistant Examiner* — James Endo
(74) *Attorney, Agent, or Firm* — Osha Liang LLP

(57) ABSTRACT

A lighting apparatus configured to be mounted on a vehicle has a housing that defines and forms at least a part of a lamp chamber, and a lamp unit disposed in the lamp chamber. The lamp unit has a light source, a heat sink to which the light source is fixed, a projection lens through which at least a part of light emitted from the light source passes, a first screw that extends through the heat sink and has a first manipulation portion, and a second screw that extends through the heat sink and has a second manipulation portion. A reference position of an optical axis of the projection lens is adjusted in a first direction by manipulating the first manipulation portion. The reference position of the optical axis is adjusted in a second direction intersecting the first direction by manipulating the second manipulation portion.

12 Claims, 12 Drawing Sheets

(51) Int. Cl.
  *B60Q 1/068* (2006.01)
  *B60Q 1/076* (2006.01)
  *F21S 41/147* (2018.01)
  *F21S 41/29* (2018.01)
  *F21S 41/39* (2018.01)
  *F21S 41/689* (2018.01)
  *F21S 45/49* (2018.01)
  *F21S 45/47* (2018.01)
  *F21S 45/50* (2018.01)
  *F21S 45/48* (2018.01)
  *F21S 41/255* (2018.01)

(52) U.S. Cl.
  CPC .............. *F21S 41/29* (2018.01); *F21S 41/39* (2018.01); *F21S 41/689* (2018.01); *F21S 45/47* (2018.01); *F21S 45/48* (2018.01); *F21S 45/49* (2018.01); *F21S 45/50* (2018.01); *F21S 41/255* (2018.01)

(58) Field of Classification Search
  CPC ...... F21S 48/1778; F21S 41/29; F21S 41/689; F21S 41/39; F21S 41/147; F21S 41/255; F21S 41/00; F21S 45/49; F21S 45/50; F21S 45/47; F21S 45/48; F21V 29/507
  USPC ................ 362/512, 538, 529, 523, 546, 547
  See application file for complete search history.

(56) References Cited

U.S. PATENT DOCUMENTS

| | | | | |
|---|---|---|---|---|
| 7,445,365 B1* | 11/2008 | Hsu | ........................ | B60Q 1/076 362/286 |
| 2002/0167818 A1* | 11/2002 | Yoneima | .................. | B60Q 1/12 362/523 |
| 2005/0180158 A1* | 8/2005 | Komatsu | .............. | F21S 48/1159 362/545 |
| 2007/0025105 A1* | 2/2007 | Inoue | .................. | B60Q 1/0683 362/249.07 |
| 2008/0247182 A1* | 10/2008 | Yasuda | .................. | B60Q 1/076 362/465 |
| 2009/0097268 A1* | 4/2009 | Mochizuki | ........... | F21S 48/1159 362/538 |
| 2009/0237938 A1* | 9/2009 | Tsutsumi | ............. | F21S 48/1154 362/257 |
| 2009/0251915 A1* | 10/2009 | Boroczki | ............ | F21S 48/1778 362/512 |
| 2010/0124069 A1* | 5/2010 | Nomura | ................ | F21S 48/145 362/512 |
| 2010/0142216 A1* | 6/2010 | Huang | ................ | F21S 48/1773 362/512 |
| 2010/0165654 A1* | 7/2010 | Okubo | ................. | F21S 48/1159 362/539 |
| 2010/0214800 A1 | 8/2010 | Yashiki et al. | | |
| 2011/0063866 A1* | 3/2011 | Shibata | .................. | B60Q 1/076 362/523 |
| 2011/0305033 A1* | 12/2011 | Sugiyama | ............. | B60Q 1/085 362/512 |
| 2012/0201042 A1* | 8/2012 | Shibata | ................ | B60Q 1/0683 362/538 |
| 2012/0257400 A1* | 10/2012 | Shibata | .................. | B60Q 1/076 362/460 |

FOREIGN PATENT DOCUMENTS

| | | | |
|---|---|---|---|
| EP | 2484556 A1 | 8/2012 | |
| EP | 2508795 A2 | 10/2012 | |
| JP | 2007-220618 A | 8/2007 | |
| JP | 2009-021135 A | 1/2009 | |
| JP | 2009-163921 A | 7/2009 | |
| JP | 2009-230940 A | 10/2009 | |
| JP | 2009-259654 A | 11/2009 | |
| JP | 2009259654 A | * 11/2009 | |
| JP | 2010-219019 A | 9/2010 | |
| JP | 2012-043656 A | 3/2012 | |
| JP | 2012-074231 A | 4/2012 | |
| JP | 2012164428 A | 8/2012 | |
| JP | 2012-221760 A | 11/2012 | |

OTHER PUBLICATIONS

Office Action issued in corresponding Chinese Application No. 201310629630.0, dated Aug. 4, 2015 (16 pages).
Patent Abstracts of Japan, Japanese Publication No. 2012-043656 dated Mar. 1, 2012 (1 page).
Office Action in counterpart Japanese Patent Application No. 2013-032310 dated Nov. 8, 2016 (12 pages).
Search Report issued in European Application No. 13194016.5, dated Mar. 22, 2018 (9 pages).

* cited by examiner

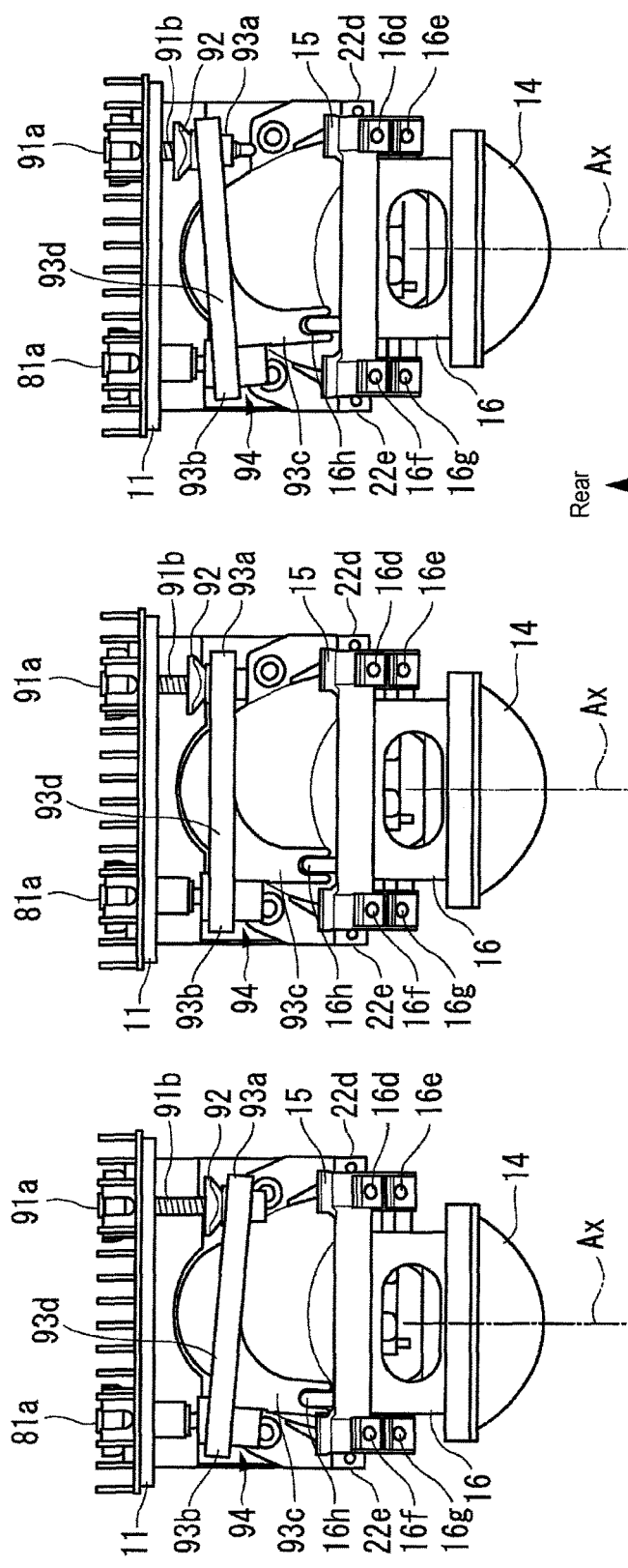

VEHICLE LIGHTING APPARATUS

CROSS REFERENCE TO RELATED APPLICATION(S)

This application is based on and claims priority under 35 U.S.C. § 119 to Japanese Patent Application Nos. 2012-265542 (filed on Dec. 4, 2012) and 2013-32310 (filed on Feb. 21, 2013), the entire contents of which are incorporated herein by reference.

BACKGROUND

1. Field

The invention relates to a lighting apparatus to be mounted in a vehicle.

2. Related Art

JP 2012-43656 A lighting apparatus having an aiming mechanism. The aiming mechanism is one making it possible to adjust a mounting angle and/or a mounting position of a lamp unit housed in a housing defining a part of a lamp chamber by manipulating a screw exposed on an outside of the housing. Such an adjustment is performed in order to eliminate deviation from a desired specification, which takes place in each lamp unit during a mounting work.

SUMMARY

The lamp unit has a heat sink to dissipate heat generated from a light source. To improve the heat dissipation efficiency, it is desirable to expose a part of the heat sink on the outside of the housing. However, in the case where the entire heat sink is displaced by the aiming mechanism as in the configuration described in JP 2012-43656 A, there is a need to take measures to prevent water and/or dust from entering the housing through a part of the heat sink exposed on the outside of housing. In order for the housing to demonstrate waterproof and dustproof functions even if the heat sink is displaced, such measures would inevitably result in an increase in cost.

If the entire heat sink is housed in the housing as described in JP 2012-43656 A, it is not necessary to consider the waterproof and dustproof measures described above. However, since heat generated from the heat sink is confined in the housing, the heat dissipation efficiency is significantly lowered. Further, since it is required to ensure a space to house the entire heat sink, it would be inevitable that the size of the lighting apparatus as a whole becomes large.

One embodiment of the invention provides a lighting apparatus that can suppress costs for waterproof and dustproof measures and reduce its size while improving a heat dissipation efficiency of a heat sink.

(1) A lighting apparatus for mount in a vehicle includes a housing and a lamp unit. The housing defines and forms at least a part of a lamp chamber. The lamp unit is disposed in the lamp chamber. The lamp unit includes a light source, a heat sink, a projection lens, a first screw, and a second screw. The light source is fixed to the heat sink. At least a part of light emitted from the light source passes through the projection lens. The first screw extends through the heat sink and has a first manipulation portion. The second screw extends through the heat sink and has a second manipulation portion. A reference position of an optical axis of the projection lens is adjusted in a first direction by manipulating the first manipulation portion. The reference position of the optical axis is adjusted in a second direction intersecting the first direction by manipulating the second manipulation portion. At least a portion of the heat sink in which the first manipulation portion and the second manipulation portion are disposed, is disposed outside the housing.

With this configuration, since heat generated from the heat sink is hardly confined inside the lamp chamber, it is possible to improve the heat dissipation efficiency. Further, the first screw and the second screw extend through the heat sink, and the reference position adjustment of the optical axis of the projection lens can be adjusted by manipulating the first manipulation portion and the second manipulation portion even without displacement of the entire heat sink. Therefore, it is possible to simplify the configuration to prevent water and/or dust from entering the housing from the exposed portion of the heat sink, to thereby contribute to suppressing cost.

Also, the portion of the hear sink is exposed on the outside of the housing, and the first screw and the second screw are provided so as to pass through such a portion. Therefore, it is possible to drastically reduce the size of the housing as compared with the configuration in which a heat sink is entirely housed inside a lamp chamber or the configuration in which a screw is disposed outside an exposed portion of a heat sink. This configuration not only contributes to cost savings but also meets demands for reduction in size and weight of the lighting apparatus, which has been required recently.

(2) In the lighting apparatus of (1), a plurality of grooves extending in a direction corresponding to a vertical direction of the vehicle may be formed in a region including a position in the heat sink opposite to the light source. The first screw and the second screw may pass through the heat sink at positions that avoid the region.

Since heat is escaped upwards, the heat generated from the light source is guided upward via the grooves efficiently. Therefore, it is possible to further improve the heat dissipation efficiency. On the other hand, the first screw and the second screw pass through the heat sink so as to avoid the region including the position in the heat sink, which is opposite to the light source. Although it is not possible to form a heat radiating groove in the positions where the first and second screws are disposed, it is possible to minimize deterioration in heat radiation efficiency caused by providing the first and second screws to pass through the heat sink.

(3) In the lighting apparatus of any one of (1) and (2), the lamp unit may include a holder that holds the projection lens. The holder includes a first portion and a second portion. The first portion is displaceable in the first direction by the first screw. The second portion is displaceable in the second direction by the second screw, independently of the first portion.

With this configuration, the adjustment of the reference position of the optical axis in the first direction and the adjustment of the reference position of the optical axis in the second direction can be carried out completely independently from each other. Since one of the adjustments of the position of the optical axis does not affect the other, the reference position adjustment operation can be facilitated and speeded up.

(4) In the lighting apparatus of (3), one of the first portion and the second portion may be displaceable so as to parallel-move the optical axis in corresponding one of the first direction and the second direction.

(5) In the lighting apparatus of (4), the other of the first portion and the second portion may be displaceable so as to tilt the optical axis in the other of the first direction and the second direction.

(6) In the lighting apparatus of (3), wherein one of the first portion and the second portion may be displaceable so as to tilt the optical axis in corresponding one of the first direction and the second direction.

(7) The lighting apparatus of any one of (1) to (4) may further include an actuator including a drive shaft that displaces the optical axis in the first direction. The first screw and the drive shaft may be disposed side by side along a direction in which the first screw and the drive shaft extend.

With this configuration, the shaft portion of the first screw can be disposed as close as possible to the drive shaft of the actuator, and the adjustment of the reference position of the optical axis of the projection lens and the adjustment of the orientation of the optical axis by the actuator can be performed on the substantially same axis. Therefore, it is possible to reduce the size of the lamp unit as compared with the configuration that the adjustments are performed on different axes.

(8) In the lighting apparatus of (7), the first direction may be a direction corresponding to the vertical direction of the vehicle.

With this configuration, the actuator can be used as a leveling actuator which is high in versatility.

(9) In the lighting apparatus of any one of (1) to (8), the lamp unit includes a movable shade that changes a shape of a light distribution pattern formed by the light emitted from the light source.

With this configuration, the optical axis of an optical system that can form the plurality of light distribution patterns can be adjusted only by the pair of screws. This is because the number of the optical axis to be adjusted is just one.

(10) In the lighting apparatus of any one of (1) to (9), a sealing member is clamped between a portion of an outer surface of the housing and a portion of the heat sink that is disposed outside the housing.

With this configuration, it is possible to prevent water and dust from entering the lamp chamber while the lamp unit is mounted to the housing from the outside.

(11) In the lighting apparatus of (10), a groove that receives the sealing member may be formed one of the portion of the outer surface and the portion of the heat sink. A protrusion that presses the sealing member is formed in the other of the portion of the outer surface and the portion of the heat sink may be formed.

With this configuration, the sealing member is received in the groove in advance when the lamp unit is mounted in the housing. Therefore, it is possible to improve the mounting workability without positional deviation of the sealing member. Further, since the sealing member is firmly held by the projection and groove, the keeping property of the sealed state is enhanced.

BRIEF DESCRIPTION OF THE DRAWINGS

FIGS. 10A to 10C are top views for explaining an operation of a second aiming mechanism;

DETAILED DESCRIPTION

Figure 1:
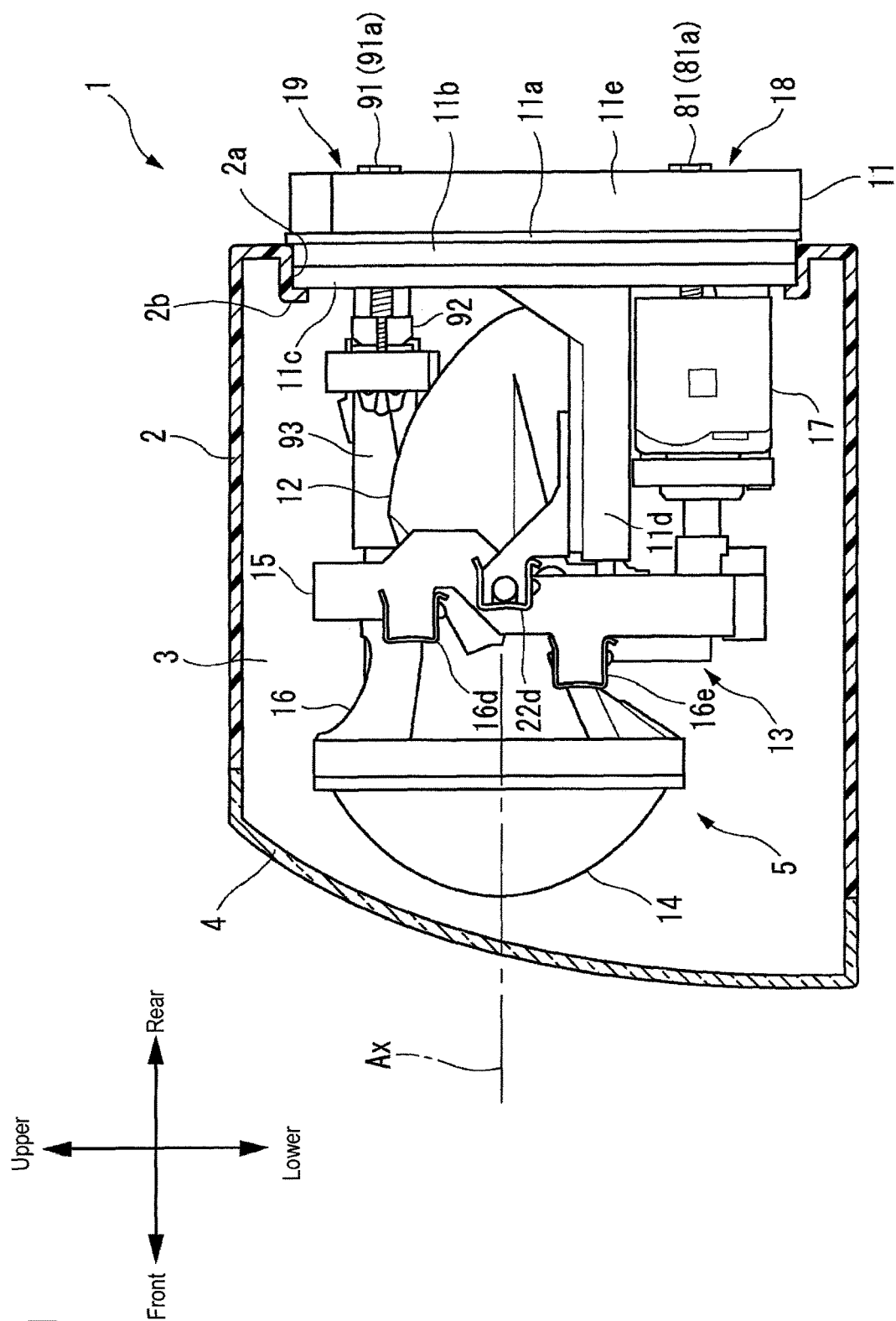
FIG. 1 is a partial section right side view showing the configuration of a lighting apparatus according to an exemplary embodiment of the invention.

Hereinafter, embodiments of the invention will be described in detail with reference to the accompanying drawings. It is noted that in the drawings with which the following descriptions will refer to, scale will be changed appropriately so that each member is recognizable.

FIG. 1 is a left side view of a part of a headlamp apparatus 1 that is a lighting apparatus according to one embodiment of the invention, taken along a vertical plane. The headlamp apparatus 1 is an apparatus that is mounted on a front portion of a vehicle to illuminate forward. The headlamp apparatus 1 includes a housing 2 and a transparent or translucent cover 4 mounted in the housing 2 to define a lamp chamber 3. A lamp unit 10 is disposed in the lamp chamber 3.

The lamp unit 10 is provided with a heat sink 11, a light source unit 12, a light distribution control unit 13, a projection lens 14, a first movable frame 15, a second movable frame 16, an actuator 17, a first aiming mechanism 18, and a second aiming mechanism 19.

The heat sink 11 is provided with a back plate portion 11a extending in the vertical and horizontal directions. A frame portion 11b having a substantially rectangular shape extends in the forward direction on a front surface of the back plate portion 11a. A support portion 11d extends in the forward direction on the front surface of the back plate portion 11a and inside the frame portion 11b.

Figure 2:
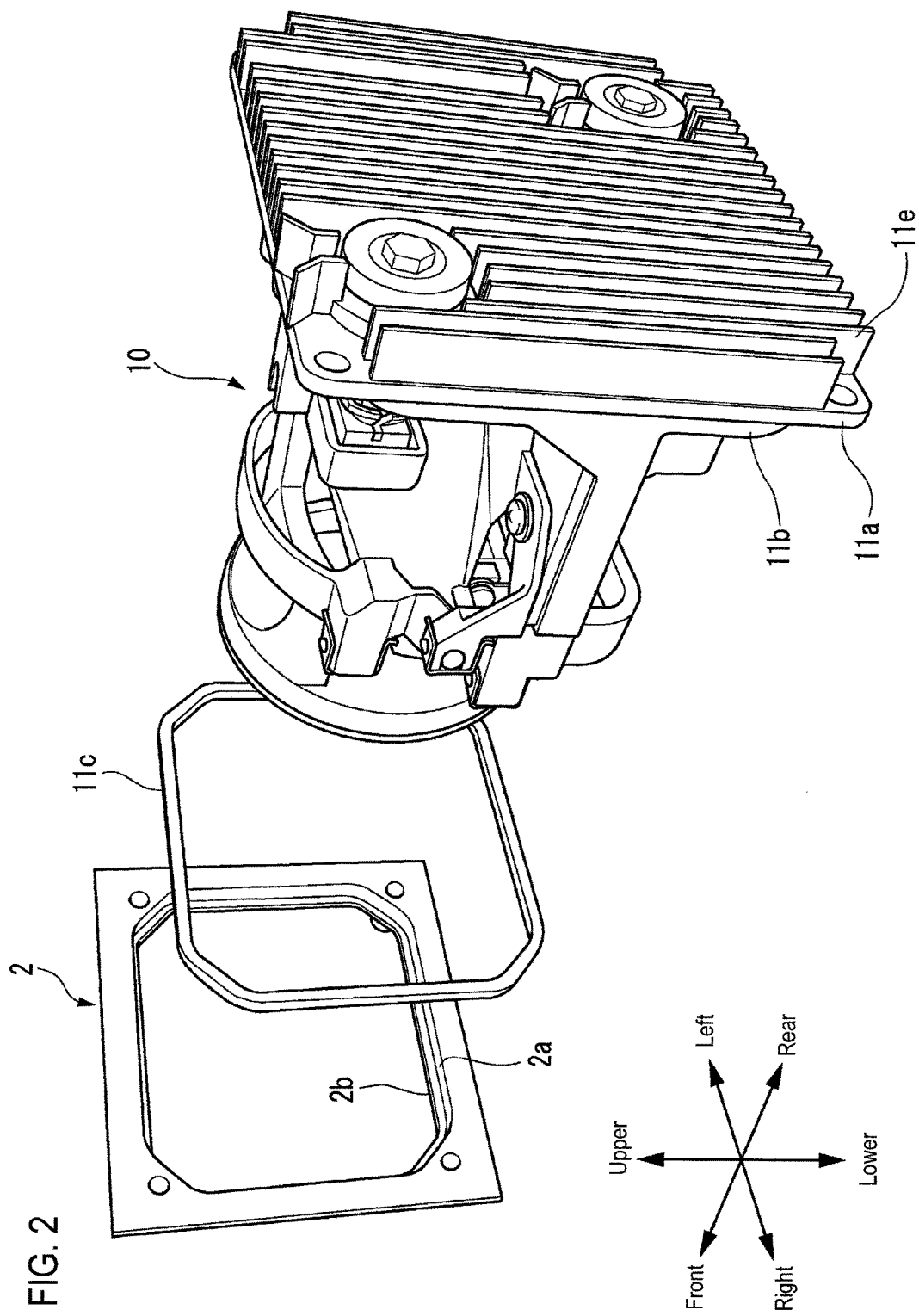
FIG. 2 is an exploded perspective view showing as to how to mount a lamp unit in a housing.

As shown in FIG. 2, an opening 2a having the same shape as the frame portion 11b of the heat sink is formed on a rear surface of the housing 2. A frame portion 2b is formed along an inner peripheral surface of the opening 2a, and a size of a front end portion of the opening 2a is smaller than that of the frame portion 11b of the heat sink 11.

As shown in FIGS. 1 and 2, a gasket 11c which is an example of a sealing member is disposed between the frame portion 2b of the opening 2a and the frame portion 11b of the heat sink 11. The gasket 11c is an annular member having elasticity. An outer peripheral edge of the gasket 11c is formed in such shape and size so as to extend along the inner peripheral surface of the opening 2a.

The lamp unit 10 is entered an inside of the lamp chamber lamp 3 by passing it through the opening 2a from the front side of the lamp unit 10. The frame 11b is fitted into the opening 2a to thereby close the opening 2a from its rear side by the back plate portion 11a of the heat sink 11. The gasket 11c is sandwiched between the frame portion 2b of the opening 2a and the frame portion 11b of the heat sink 11 to thereby watertightly seal the lamp chamber 3. Therefore, while the light unit 10 is attached to the housing 2 from the outside of the housing 2, this configuration can prevent dust and water from entering the lamp chamber 3.

Figure 3:
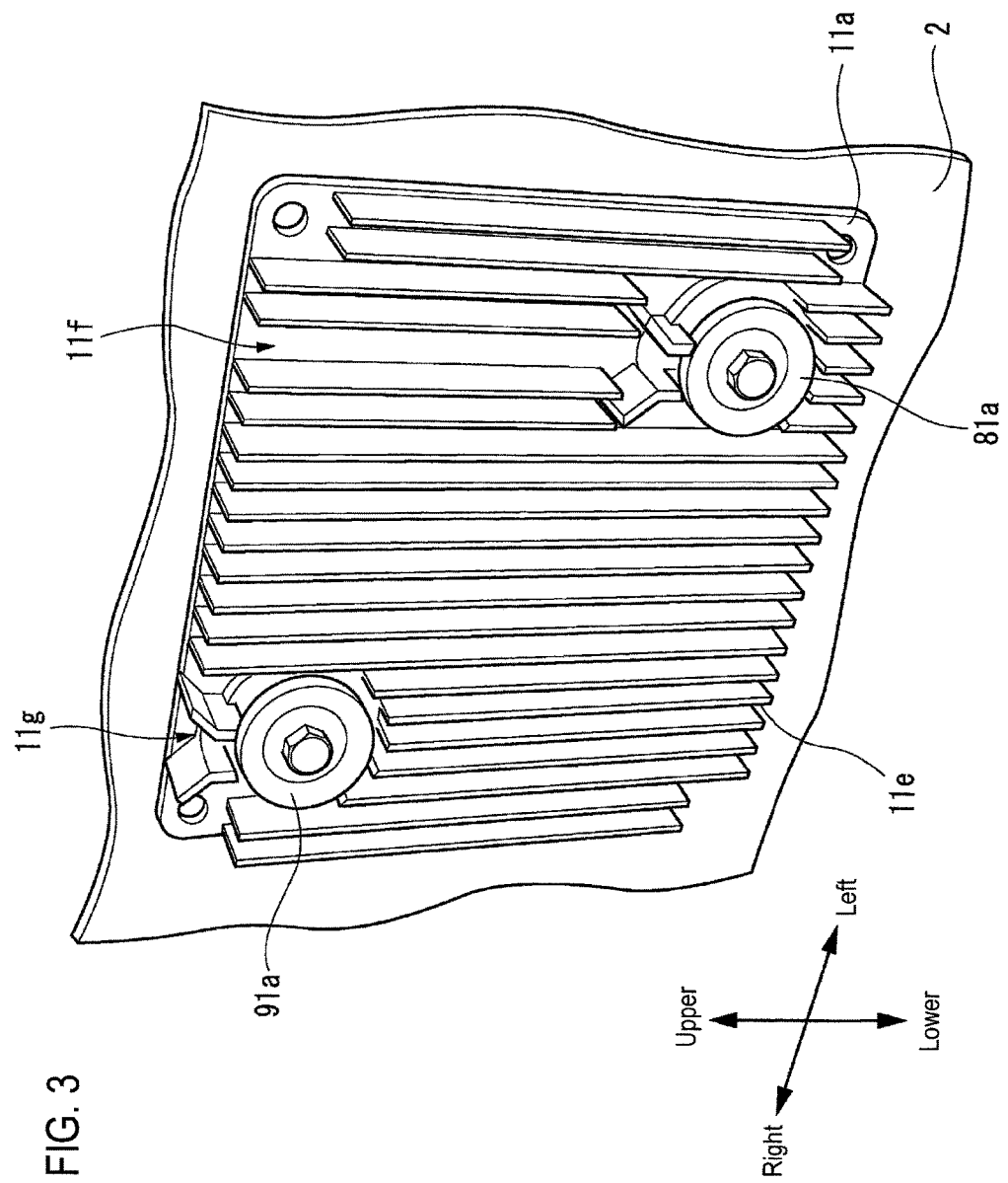
FIG. 3 is a perspective view showing an appearance of a part of the lighting apparatus when viewed from a rear side thereof.

FIG. 3 shows an appearance of a part of the housing 2 of the headlamp apparatus 1 when viewed from the rear side thereof. A plurality of heat radiating plates 11e are formed on the rear side of the back plate portion 11a of the heat sink 11. Each heat radiating plates 11e extends in the vertical direction.

Figure 4:
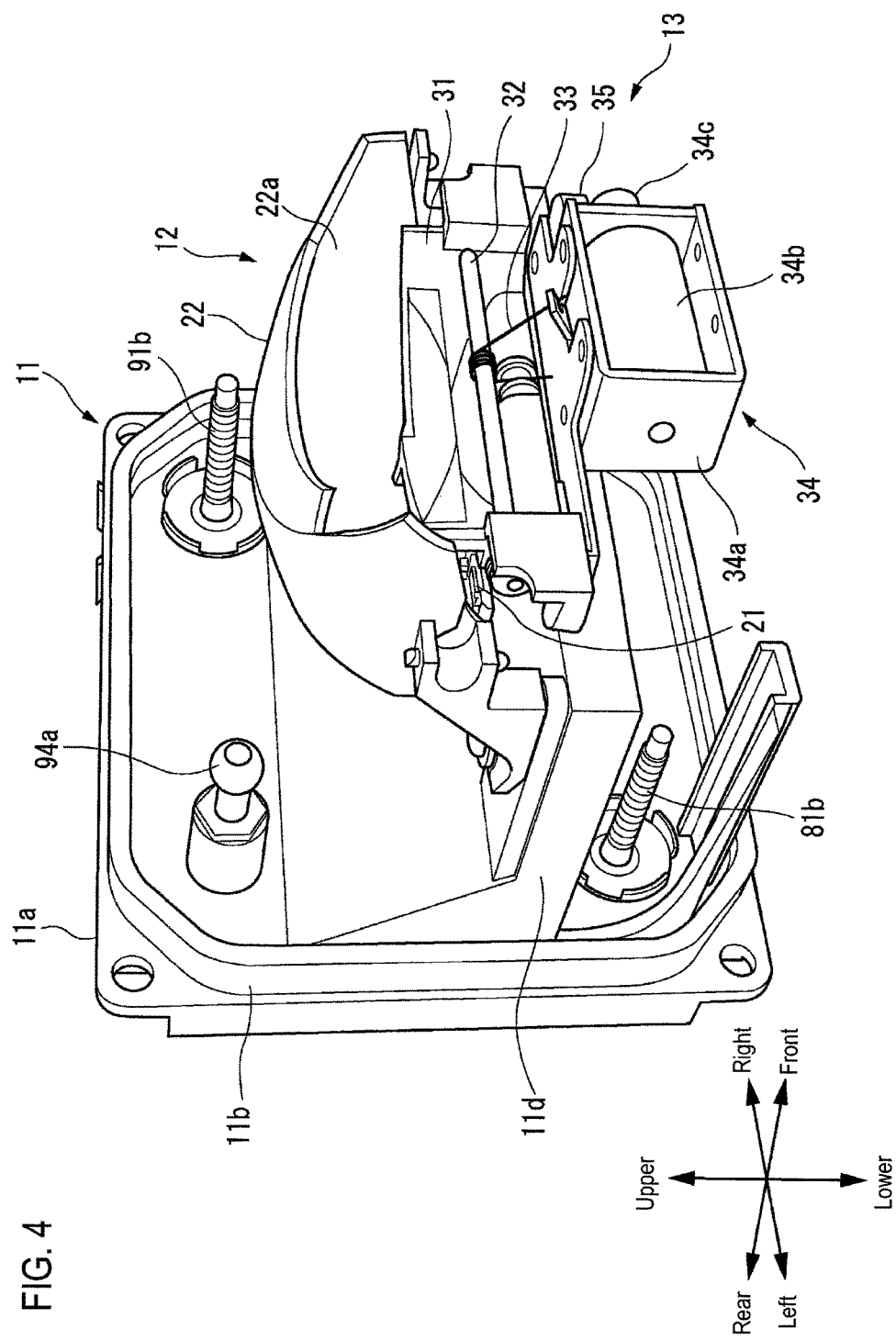
FIG. 4 is a perspective view showing a part of the lamp unit provided in the lighting apparatus.

FIG. 4 shows, as a part of the lamp unit 10, the heat sink 11, the light source unit 12, and the light distribution control unit 13.

The light source unit 12 includes a light source 21a and a reflector 22. In this embodiment, a white light emitting diode (LED) is used as the light source 21. The light source 21 and the reflector 22 are fixed to the support portion 11d of the heat sink 11. An inner surface of the reflector 22 that is formed in a dome shape serves as a reflection surface 22a, and is disposed so as to face the light source 21.

More specifically, the reflection surface 22a of the reflector 22 is formed so as to constitute a part of a substantially elliptical spherical surface having an optical axis Ax of the projection lens 14 as a center axis (see FIG. 1). The light source 21 is disposed at a first focal point of an ellipse forming a vertical section of the reflection surface 22a. Light emitted from the light source 21 converges at a second focal point of the ellipse.

The projection lens 14 is a plano-convex aspheric lens whose emission surface is a convex surface and whose incidence surface is a flat surface and is disposed so that a rear focal point of the projection lens 14 is located at the second focal point of the ellipse. The light emitted from the light source 21 is reflected toward the forward direction by the inner surface 22a of the reflector 22, and at least a part of the reflected light passes through the projection lens 14. The light passing through the projection lens 14 illuminates the front side through the cover 4.

The light distribution control unit 13 includes a movable shade 31, a rotary shaft 32, a coil spring 33, a solenoid 34, and a link 35.

The movable shade 31 is disposed at a slight distance on the front side of the rear focal point of the projection lens 14. Thus, a part of the light, which is emitted from the light source 21 and reflected by the reflection surface 22a of the reflector 22, is blocked by the movable shade 31. A shape of an upper edge of the movable shade 31 is projected forward in an inverted manner, so that a low beam light distribution pattern having a cutoff line corresponding to the shape of the upper edge and an illumination area below the cutoff line is formed ahead of the vehicle.

The movable shade 31 is rotated about the rotary shaft 32a and thus is tiltable forward. The coil spring 33 generates a biasing force so that the movable shade 31 is placed on a normal position (light shielding position) shown in FIG. 4.

The solenoid 34 is provided with a yoke casing 34a, a coil 34b, and a plunger 34c. The coil 34b is housed in the yoke casing 34a to form a magnetic circuit. The plunger 34c is an iron core that is inserted into a hollow core portion of a bobbin (not shown) around which the coil 34b is wound and movable in the lateral direction.

The link 35 connects the plunger 34c and one end of the rotary shaft 32. When power is supplied to the coil 34b, the plunger 34c is attracted to the coil 34b side by the magnetic force generated. The link 35 is formed so that the movable shade 31 is tilted forward against the biasing force of the coil spring 33 in response to the above described operation of the plunger 34c.

Thus, the upper edge of the movable shade 31 is retracted below the optical axis Ax of the projection lens 14, and the light shielding state of the light emitted from the light source 21 is cancelled. The light emitted from the light source 21 and reflected by the reflector 22 passes through the projection lens 14 to form a high beam light distribution pattern with which a widespread area far ahead of the vehicle is illuminated.

That is, the movable shade 31 can change, according to its position, the shape of the light distribution pattern, which is formed by the light emitted from the light source 21.

As shown in FIGS. 1 and 5 to 7, the first movable frame 15 is disposed on the front side of the reflector 22. The first movable frame 15 includes a right portion 15a, a left portion 15b, an upper portion 15c, and a lower portion 15d.

The right portion 15a extends in the vertical direction and includes an upper right bearing portion 15a1, a lower right bearing portion 15a2, and a right rotary shaft 15a3. The upper right bearing portion 15a1 is open to the front at an upper portion of the right portion 15a and has a groove extending in the lateral direction. The lower right bearing portion 15a2 is open to the front at a lower portion of the right portion 15a and has a groove extending in the lateral direction. The right rotary shaft 15a3 is a protrusion having a cylindrical shape and extending rightward from the right portion 15a between the upper right bearing portion 15a1 and the lower right bearing portion 15a2.

The left portion 15b extends in the vertical direction and includes an upper left bearing portion 15b1, a lower left bearing portion 15b2, and a left rotary shaft 15b3. The upper left bearing portion 15b1 is open to the front at an upper portion of the left portion 15b and has a groove extending in the lateral direction. The lower left bearing portion 15b2 is open to the front at a lower portion of the left portion 15b and has a groove extending in the lateral direction. The left rotary shaft 15b3 is a protrusion having a cylindrical shape and extending leftward from the left portion 15b between the upper left bearing portion 15b1 and the lower left bearing portion 15b2.

The upper portion 15c extends in the lateral direction so as to connect an upper end portion of the right portion 15a and an upper end portion of the left portion 15b. The lower portion 15d extends in the lateral direction so as to connect a lower end portion of the right portion 15a and a lower end portion of the left portion 15b.

Figure 5:
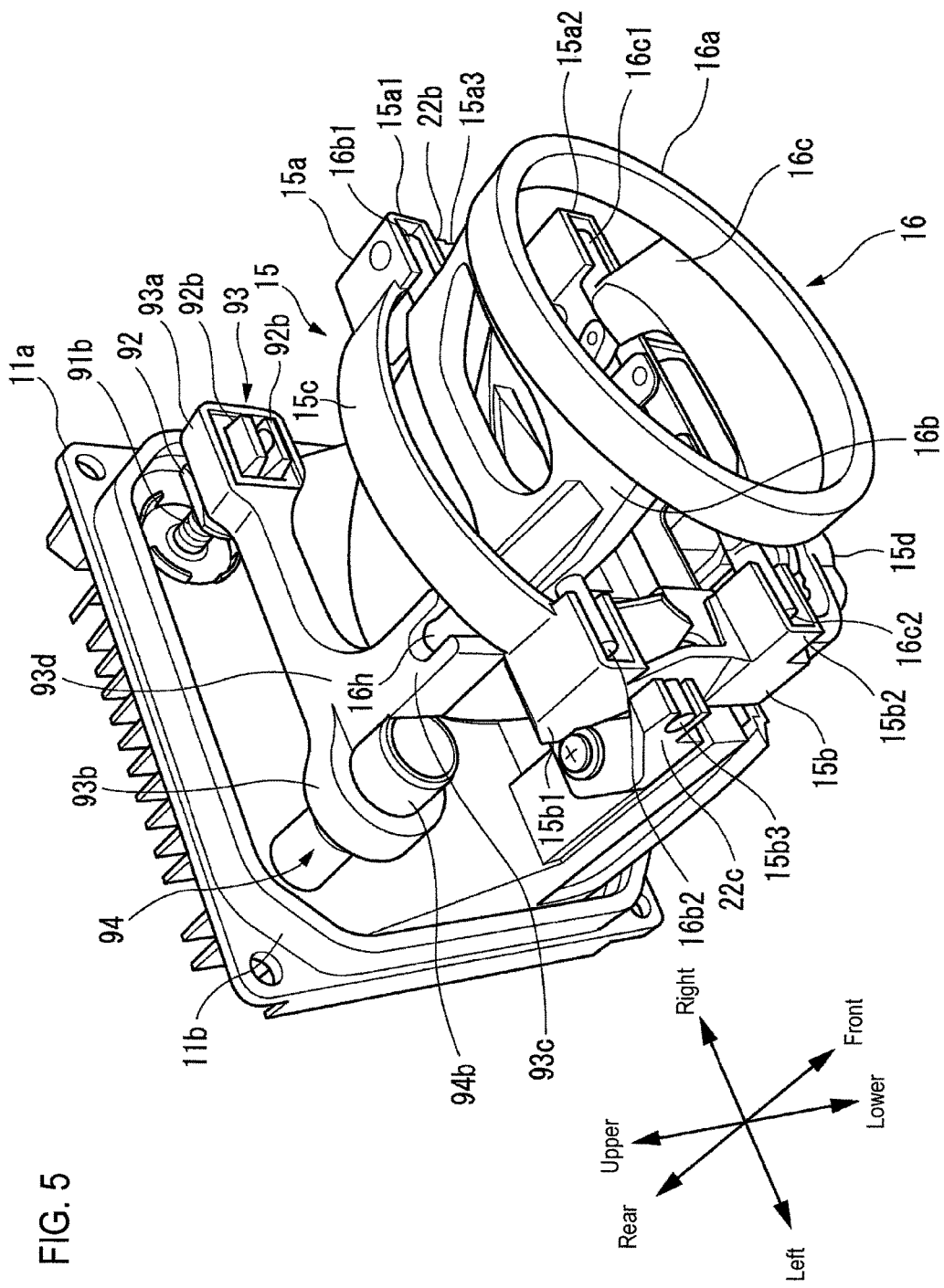
FIG. 5 is a perspective view showing a part of the lamp unit.

As shown in FIG. 5, the reflector 22 is provided with a right bearing portion 22b and a left bearing portion 22c. The right bearing portion 22b is open to the front at a right end portion of the reflector 22 and has a groove extending in the lateral direction. The left bearing portion 22b is open to the front at a left end portion of the reflector 22 and has a groove extending in the lateral direction.

Figure 6:
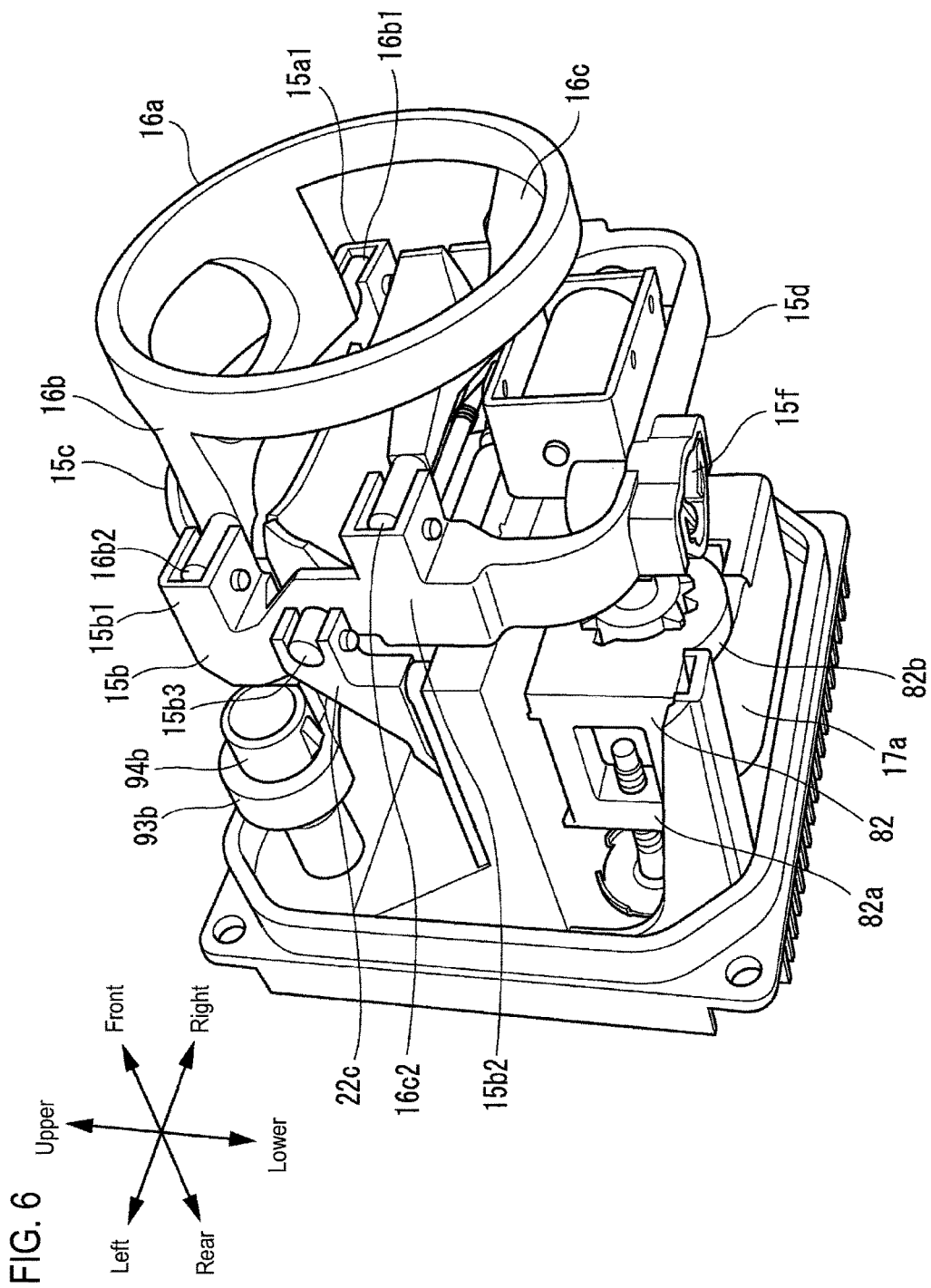
FIG. 6 is a perspective view showing a part of the lamp unit.
Figure 7:
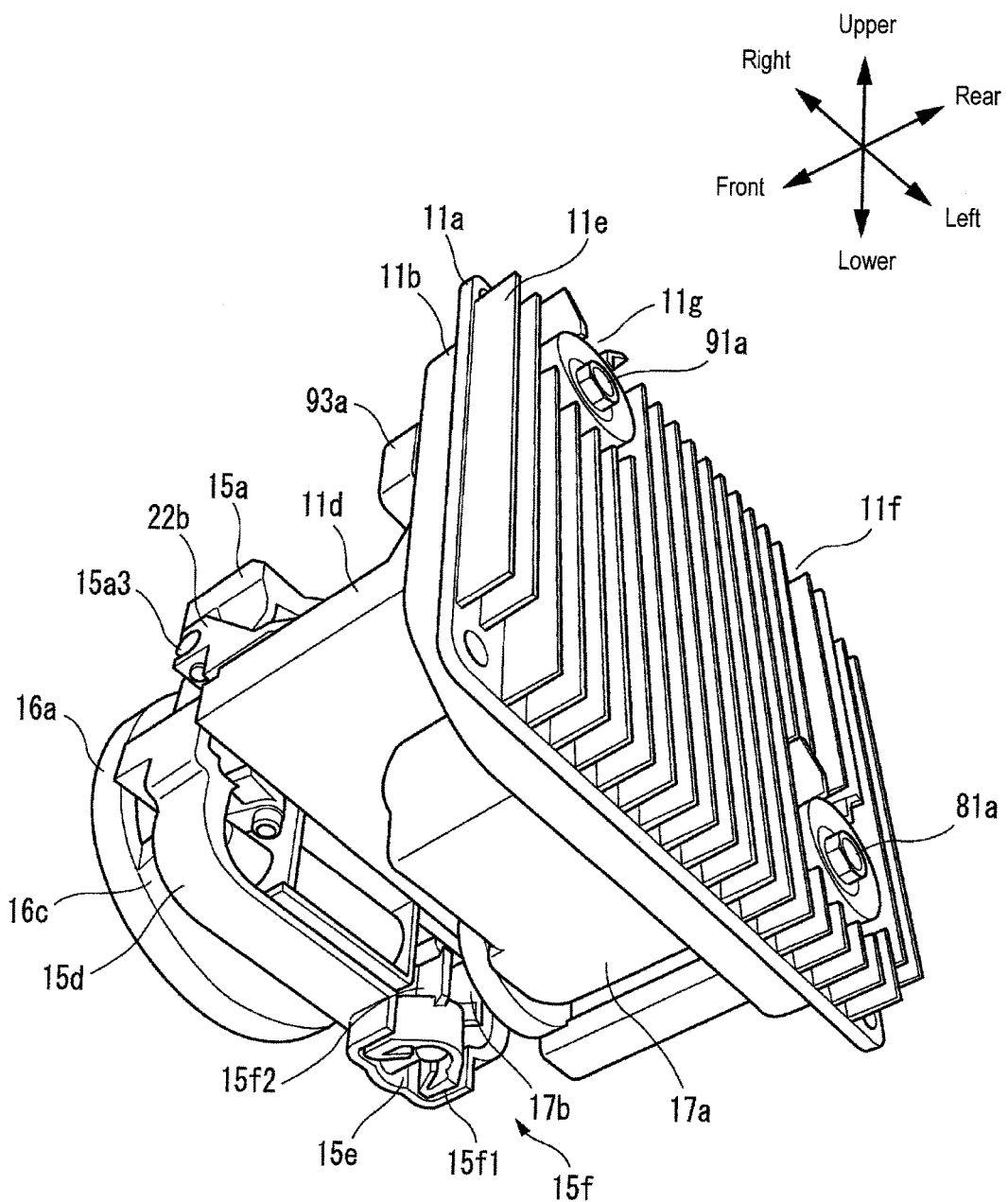
FIG. 7 is a perspective view showing a part of the lamp unit.

As shown in FIGS. 5 to 7, the right rotary shaft 15a3 and the left rotary shaft 15b3 of the first movable frame 15 are inserted into the right bearing portion 22b and the left bearing portion 22c of the reflector 22, respectively. At this time, the light distribution control unit 13 is disposed within an opening defined and formed by the right portion 15a, the left portion 15b, the upper portion 15c, and the lower portion 15d.

As shown in FIG. 1, a holding member 22d is fitted from the front side to the right bearing portion 22a of the reflector 22 to thereby prevent the right rotary shaft 15a3 of the first movable frame 15 from falling off forward. A holding member 22e (see FIG. 10) is fitted in a similar manner to the left bearing portion 22b of the reflector 22 to thereby prevent the right rotary shaft 15a3 of the first movable frame 15 from falling off forward.

As shown in FIGS. 1 and 5 to 7, the second movable frame 16 is disposed on the front side of the first movable frame 15. The second movable frame 16 is provided with a lens holding portion 16a, an upper portion 16b, and a lower portion 16c.

The lens holding portion 16a is an annular frame. The projection lens 14 is fixed to a front surface of the lens holding portion 16a. The upper portion 16b extends rearward from an upper end portion of the lens holding portion 16a. The lower portion 16c extends rearward from a lower end portion of the lens holding portion 16a.

The upper portion 16b is provided with an upper right shaft 16b1 and an upper left shaft 16b2. The upper right shaft 16b1 is a protrusion having a cylindrical shape and extending rightward from a rear end portion of the upper portion 16b. The upper left shaft 16b2 is a protrusion having a cylindrical shape and extending leftward from a rear end portion of the upper portion 16b.

The lower shaft 16c is provided with a lower right shaft 16c1 and a lower left shaft 16c2. The lower right shaft 16c1 is a protrusion having a cylindrical shape and extending rightward from a rear end portion of the lower portion 16c. The lower left shaft 16c2 is a protrusion having a cylindrical shape and extending leftward from a rear end portion of the lower portion 16c.

As shown in FIGS. 5 to 7, the upper right shaft 16b1, the upper left shaft 16b2, the lower right shaft 16c1, and the lower left shaft 16c2 of the second movable frame 16 are inserted into the upper right bearing portion 15a1, the upper left bearing portion 15b1, the lower right bearing portion 15a2, and the lower left bearing portion 15b2 of the first movable frame 15, respectively.

As shown in FIG. 1, holding members 16d, 16e are fitted from the front side to the upper right bearing portion 15a1 and the lower right bearing portion 15a2 of the first movable frame 15, respectively, to thereby prevent the upper right shaft 16b1 and the lower right shaft 16c1 of the second movable frame 16 from falling off forward. Similarly, holding members 16f, 16g (see FIG. 10) are fitted from the front side to the upper left bearing portion 15b1 and the lower left bearing portion 15b2 of the first movable frame 15, respectively, to thereby prevent the upper left shaft 16b2 and the lower left shaft 16c2 of the second movable frame 16 from falling off forward.

As shown in FIG. 5, a gap is formed between an end portion of each of the upper right shaft 16b1, the upper left shaft 16b2, the lower right shaft 16c1, and the lower left shaft 16c2 of the second movable frame 16 and a corresponding end portion of each of the upper right bearing portion 15a1, the upper left bearing portion 15b1, the lower right bearing portion 15a2, and the lower left bearing portion 15b2 of the first movable frame 15. Thereby, the second movable frame 16 is allowed to be displaced in the lateral direction with respect to the first movable frame 15.

As shown in FIG. 7, at a left side portion of the lower portion 15c of the first movable frame 15, a joint protrusion 15e extends rearward. A spherical coupling portion is formed on a leading end of the joint protrusion 15e. The joint protrusion 15e is fitted from the rear side to a joint member 15f.

The joint member 15f is provided with a lower joint portion 15f1 and an upper joint portion 15f2. The lower joint portion 15f1 is provided with a pair of clamping pieces extending forward. The upper joint portion 15f2 is provided with a pair of clamping pieces extending rearward. The clamping pieces of the lower joint portion 15f1 clamp the spherical coupling portion of the joint protrusion 15e. The spherical coupling portion is allowed to move in vertical and horizontal directions between the clamping pieces.

The actuator 17 is disposed on the rear side of the first movable frame 15 and below the support portion 11d of the heat sink 11. The actuator 17 includes a main body casing 17a and a drive shaft 17b. The drive shaft 17b moves forward and backward relative to the main body casing 17a in response to a control signal which a driving circuit provided in the main body casing 17a receives from a controller (not shown) provided outside the lamp unit 10.

As shown in FIG. 7, the actuator 17 is disposed so that the drive shaft 17b thereof is directed forward. Although not shown, a leading end of the drive shaft 17b is formed into a spherical coupling portion. This spherical coupling portion is clamped between the clamping pieces of the upper joint portion 15f2 of the joint member 15f and is allowed to move in the vertical and lateral directions between the clamping pieces.

Next, the first aiming mechanism 18 will be described with reference to FIGS. 3, 4 6, and 7. The first aiming mechanism 18 includes a first aiming screws 81 (an example of a first screw) and a joint member 82.

As shown in FIGS. 3 and 4, the first aiming screw 81 includes a head portion 81a and a shaft portion 81b. The head portion 81a is disposed on the rear surface in a lower left portion of the back plate 11a of the heat sink 11 and is exposed on the outside of housing 2. The shaft portion 81b passes through the back plate 11a of the heat sink 11, and extends forward on the inside of the frame portion 11. Thread groove is formed on an outer peripheral surface of the shaft portion 81b.

As shown in FIGS. 6 and 7, the joint member 82 is provided with a first joint portion 82a and a second joint portion 82b. The first joint portion 82a is formed with an insertion hole. Thread groove is formed on an inner peripheral surface of the insertion hole. The shaft portion 81b of the first aiming screw 81 is inserted through the insertion hole formed in the first joint portion 82a of the joint member 82, and the thread grooves thereof are screwed together.

The second joint portion 82b is coupled with a portion of the main body casing 17a of the actuator 17. Thereby, the first aiming screw 81 is coupled with the actuator 17.

Next, the second aiming mechanism 19 will be described with reference to FIGS. 1 to 5. The second aiming mechanism 19 includes a second aiming screw 91 (an example of a second screw), a joint member 92, a link member 93, and a fulcrum member 94.

As shown in FIGS. 3 and 4, the second aiming screw 91 includes a head portion 91a and a shaft portion 91b. The head portion 91a is disposed on a rear surface of an upper right portion of the back plate 11a of the heat sink 11 and is exposed on the outside of the housing 2. The shaft portion 91b passes through the back plate 11a of the heat sink 11 and extends forward on the inside of the frame portion 11b. Thread groove is formed on an outer peripheral surface of the shaft portion 91b.

As shown in FIGS. 1, 5 and 8, the joint member 92 is formed with a pair of clamping pieces 92a having thread grooves that are formed respectively on surfaces facing each other. By clamping, from the upper and lower directions, the shaft portion 91b of the second aiming screw 91 by the pair of clamping pieces 92a, the thread groove of the shaft portion 91b and the thread groove of the clamping piece 92a are screwed together. An engaging portion 92b is formed in a front end portion of each clamping piece 92a.

As shown in FIG. 5, the link member 93 includes a first joint portion 93a, a second joint portion 93b, a third joint portion 93c, and a body portion 93d. The first joint portion 93a is a portion that is coupled to the second aiming screw 91 via the joint member 92. The second joint portion 93b is a portion that is coupled to the fulcrum member 94 which will be described later. The third joint member 93c is a portion that is coupled to the second movable frame 16. The main body portion 93d has a portion extending in the lateral direction to connect the first joint portion 93a and the second joint portion 93b and a portion extending in the forward and backward directions to connect the second joint portion 93b and the third joint portion 93c.

An insertion hole having a rectangle shape is formed in the first joint portion 93a. The clamping pieces 92a of the joint member 92 are inserted from the rear side into the insertion hole, and the engaging portions 92b of the clamping pieces 92a are engaged with a front surface of the first joint portion 93a. Thereby, the joint member 92 is prevented from falling off from the second aiming screw 91.

A groove that is open to the front is formed in the third joint portion 93c. Meanwhile, a joint protrusion 16h extending rearward is formed in a left portion of a rear end portion of the upper portion 16b of the second movable frame 16. The joint protrusion 16h is inserted into the groove formed in the third joint portion 93c.

The fulcrum member 94 includes a joint protrusion 94a and a holding member 94b. As shown in FIG. 4, the joint protrusion 94a extends forward in an upper left portion of the back plate 11a of the heat sink 11 and inside the frame portion 11b. A leading end portion of the joint protrusion 94a is formed into a spherical coupling portion.

A circular insertion hole is formed in the second joint portion 93b of the link member 93. The joint protrusion 94a of the fulcrum member 94 is inserted from the rear side of the insertion hole into the insertion hole, and the holding member 94b of the fulcrum member 94 is inserted from the front thereof. Although not shown, such a configuration is formed in the holding member 94b that the spherical coupling portion of the joint protrusion 94a is fitted thereinto so as to be allowed to move in the vertical and horizontal directions.

Next, it will be described as to how the lamp unit 10 moves in response to manipulation of the first aiming mechanism 18. As shown in FIGS. 3 and 7, a jig insertion groove 11f extending in parallel to the heat radiating plates 11e of the heat sink 11 is formed above the head portion 81a of the first aiming screw 81.

When the head portion 81a of the first aiming screw 81 is rotationally manipulated by a known jig which is inserted into the jig insertion groove 11f, the screwed position between the shaft portion 81b and the first joint portion 82a of the joint member 82 is changed, and the joint member 82 is displaced in the forward and backward directions. Since the joint member 82 is coupled to the main body casing 17a of the actuator 17, the actuator 17 is also displaced in the forward and backward directions as the first aiming screw 81 rotates.

Figure 8A:
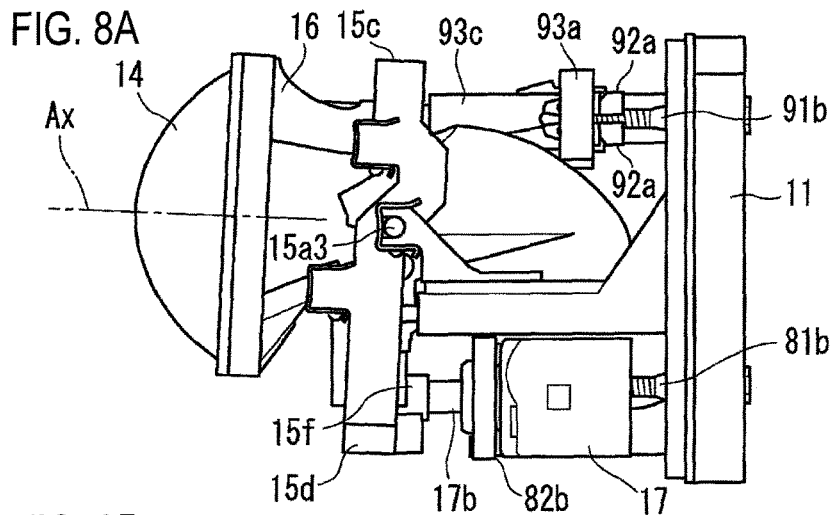
FIGS. 8A to 8C are right side views for explaining an operation of a first aiming mechanism.
Figure 8B:
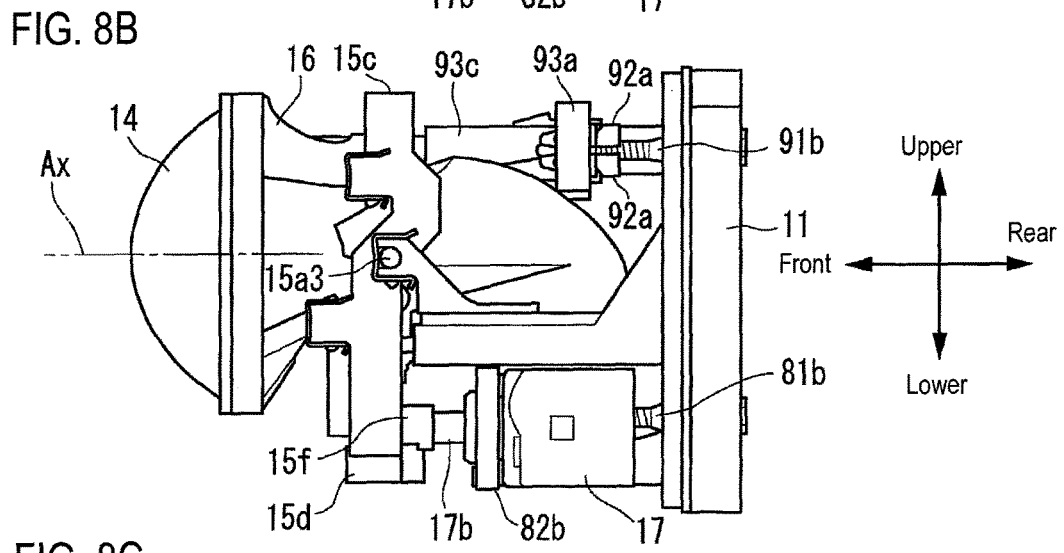
Figure 8C:
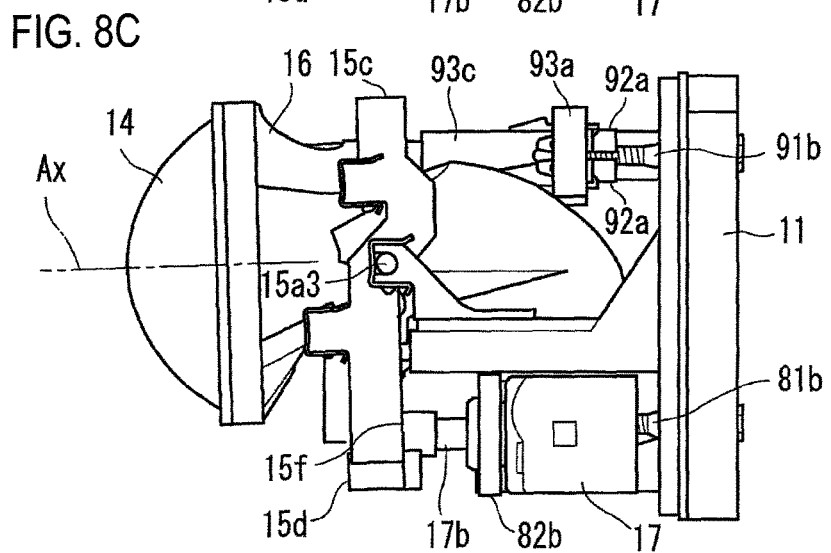

FIGS. 8A to C are right side views for explaining as to how each part of the lamp unit 10 moves in response to the rotation of the first aiming screws 81. FIG. 8B shows an initial state. When the first aiming screw 81 is rotated in the left direction (counterclockwise direction) from this initial state, the actuator 17 is pushed forward.

Accordingly, as shown in FIG. 8A, the lower portion 15d of the first movable holder 15 is pushed forward. While the connection between the joint member 15f and the drive shaft 17b of the actuator 17 is secured, the joint protrusion 15e is tilted upward. Thereby, the first movable holder 15 is rotated about the right rotary shaft 15a3 and the left rotary shaft 15b3, and the upper portion 15c is displaced rearward. As a result, the second movable holder 16 supported by the first movable holder 15 is tilted upward. Further, the optical axis Ax of the projection lens 14 supported by the second movable holder 16 is also tilted upward.

On the other hand, when the first aiming screw 81 is rotated in the right direction (clockwise direction) in the state shown in FIG. 8B, the actuator 17 is displaced rearward. Accordingly, as shown in FIG. 8C, the lower portion 15d of the first movable holder 15 is pulled rearward. While the connection between the joint member 15f and the drive shaft 17b of the actuator 17 is secured, the joint protrusion 15e is tilted downward. Thereby, the first movable holder 15 is rotated about the right pivot shaft 15a3 and the left rotary shaft 15b3 and the upper portion 15c is displaced forward. As a result, the second movable holder 16 supported by the first movable holder 15 is tilted downward. The optical axis Ax of the projection lens 14 supported by the second movable holder 16 is also tilted downward.

That is, by manipulating the head portion 81a (an example of the first manipulation portion) of the first aiming screw 81, a reference position of the optical axis Ax of the projection lens 14 is adjusted in the vertical direction (an example of a first direction).

Figure 9A:
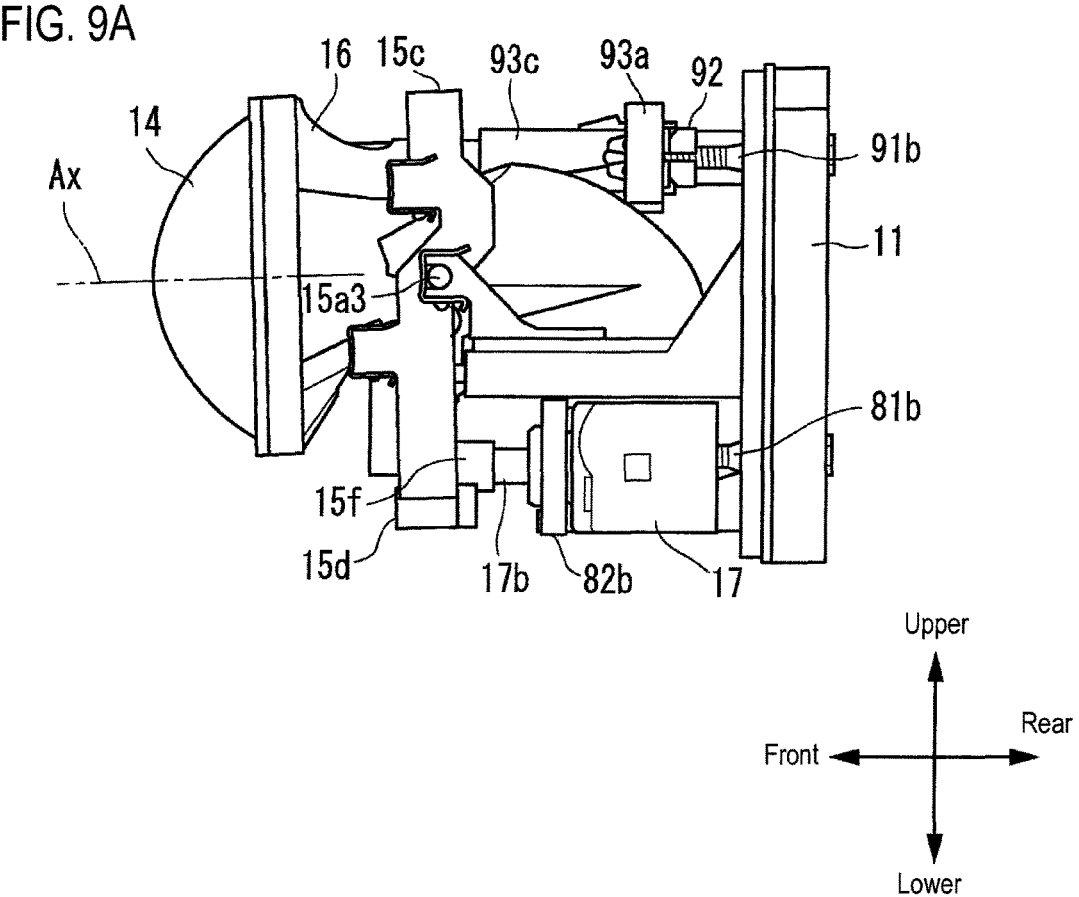
FIGS. 9A and 9B are right side views for explaining an operation of a leveling actuator.
Figure 9B:
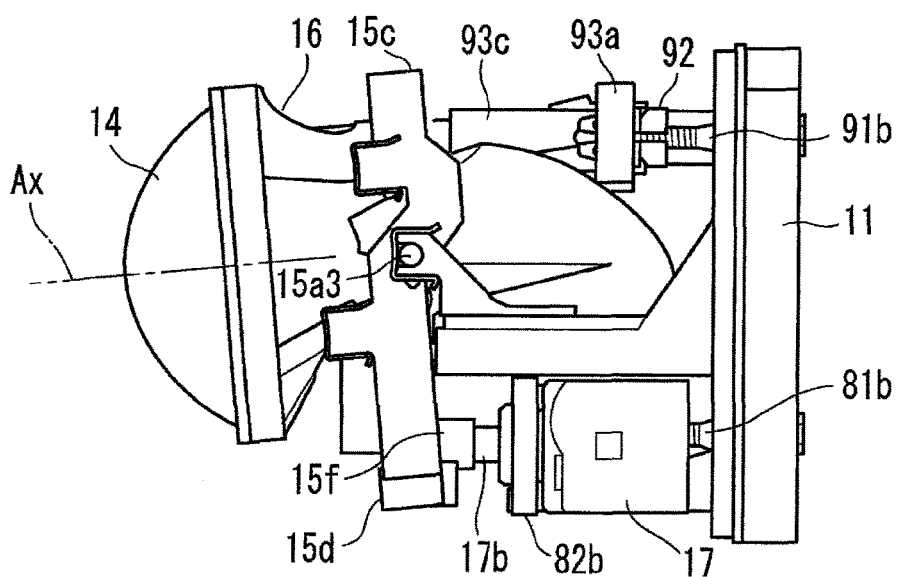

The actuator 17 is a mechanism that changes a direction of the optical axis Ax of the projection lens 14 in the vertical direction of the vehicle in response to a change in vehicle height caused by putting baggage in the vehicle and/or by a change in number of passengers. FIGS. 9A and 9B are right side views for explaining as to how each part of the lamp unit 10 moves in response to the operation of the actuator 17.

FIG. 9A shows the state shown in FIG. 8C, that is, the state where the optical axis Ax of the projection lens 14 is tilted downward by the manipulation of the first aiming screws 81. FIG. 9B shows a state where the drive shaft 17b is pulled rearward by operating the actuator 17 in the state shown in FIG. 9A.

The retraction of the driving shaft 17b leads to further rearward pulling of the lower portion 15d of the first movable holder 15. While the connection between the joint member 15f and the drive shaft 17b of the actuator 17 is secured, the further downward tilting of the joint protrusion 15e results in that the first movable holder 15 is rotated about the right rotary shaft 15a3 and the left rotary shaft 15b3, and the upper portion 15c is displaced further forward. Thereby, the second movable holder 16 supported by the first movable holder 15 is tilted further downward. The optical axis Ax of the projection lens 14 supported by the second movable holder 16 is also tilted further downward.

That is, further advancing or retracting the drive shaft 17b of the actuator 17 with the position of the optical axis Ax of the projection lens 14, which is adjusted by the manipulation of the first aiming screw 81, being regarded as a reference position causes the optical axis Ax to be further displaced in the vertical direction.

Next, a description will be given as to how the lamp unit 10 moves in response to manipulation of the second aiming mechanism 19. As shown in FIGS. 3 and 7, above a jig insertion groove 11g extending in parallel to the heat radiating plates 11e of the heat sink 11 are formed above the head portion 91a of the second aiming screw 91.

When the head portion 91a of the second aiming screw 91 is rotationally manipulated by a known jig which is inserted into the jig insertion groove 11g, the screwing position between the shaft portion 91b and the joint member 92 is changed and the joint member 92 is displaced in the vertical direction. Since the joint member 92 is engaged with the first joint portion 93a of the link member 93, the first joint portion 93a is also displaced in the longitudinal direction in accordance with the rotation of the second aiming screw 91.

FIGS. 10A to 10C are top views for explaining as to how each part of the lamp unit 10 moves in response to the rotation of the second aiming screw 91. In FIG. 10B shows an initial state. When the second aiming screw 91 is rotated in the left direction (counterclockwise direction) in this state, the first joint portion 93a of the link member 93 is pushed forward.

Thereby, as shown in FIG. 10A, the main body portion 93d of the link member 93 is rotated leftward (clockwise direction in the top view) about the second joint portion 93b while the connection between the link member 93 and the fulcrum member 94 is secured, and the third joint portion 93c pushes the joint protrusion 16h of the second movable frame 16 in the left direction. Thereby, the upper right shaft 16b1, the upper left shaft 16b2, the lower right shaft 16c1 and the lower left shaft 16c2 of the second movable frame 16 respectively slide, in the left direction, in the interior of the upper right bearing portion 15a1, the upper left bearing portion 15b1, the lower right bearing portion 15a2, and the lower left bearing portion 15b2 of the first movable frame 15, and the second movable frame 16 is displaced to the left. Thus, the optical axis Ax of the projection lens 14 supported by the second movable holder 16 is parallel-displaced to the left.

On the other hand, when the second aiming screw 91 is rotated in the right direction (clockwise direction) in the state shown in FIG. 10B, the first joint portion 93a of the link member 93 is pulled rearward. Thereby, as shown in FIG. 10C, while the connection between the link member 93 and the fulcrum member 94 is secured, the main body portion 93d of the link member 93 is rotated in the right direction (counterclockwise direction in the top view) about the second joint portion 93b, and the third joint portion 93c pushes the joint protrusion 16h of the second movable frame 16 in the right direction. Thereby, the upper right shaft 16b1, the upper left shaft 16b2, the lower right shaft 16c1, and the lower left shaft 16c2 of the second movable frame 16 respectively slide in the right direction in the interior of the upper right bearing portion 15a1, the upper left bearing portion 15b1, the lower right bearing portion 15a2, and the lower left bearing portion 15b2 of the first movable frame 15, and the second movable frame 16 is displaced to the right. Thus, the optical axis Ax of the projection lens 14 supported by the second movable holder 16 is parallel-translated to the right.

That is, by manipulating the head portion 91a (an example of the second manipulation portion) of the second aiming screw 91, a reference position of the optical axis Ax of the projection lens 14 is adjusted in the lateral direction (an example of a second direction).

As described above, in the headlamp apparatus 1 according to this exemplary embodiment, of the heat sink 11, at least portions at which the head portion 81a of the first aiming screw 81 and the head portion 91a of the second aiming screw 91 are provided are exposed on the outside of the housing 2. Therefore, since heat generated from the heat sink 11 is hardly confined inside the lamp chamber 3, it is possible to improve the heat dissipation efficiency.

Further, the first aiming screw 81 and the second aiming screw 91 extend through the heat sink 11, and the reference position of the optical axis Ax of the projection lens 14 can be adjusted by manipulating the respective head portions 81a, 91a without the entire heat sink 11 being displaced. Therefore, it is possible to simplify the configuration to prevent dust and/or water from entering the housing 2 through the exposed portion of the heat sink 11, which contributes to suppressing cost.

Also, the portion of the heat sink 11 is exposed on the outside of the housing 2, and the first aiming screw 81 and the second aiming screw 91 are provided so as to pass through the exposed portion of the heat sink 11. Therefore, it is possible to drastically reduce the size of the housing 2 as compared with the configuration in which a heat sink is entirely housed in a lamp chamber or the configuration in which an aiming screw is provided on an outside of an exposed portion of a heat sink. The above configuration not only contributes to cost savings but also meets the demands for reduction in size and weight of the lighting apparatus, which has been required recently.

In this exemplary embodiment, each of the heat radiating plates 11e of the heat sink 11 form therebetween grooves extending in the upper and lower directions. Since the generated heat tends to escape upward, the heat generated from the light source 21 and transmitted to the heat radiating plates 11e is efficiently led upward in the grooves. Therefore it is possible to further improve the heat dissipation efficiency.

On the other hand, the first aiming screw 81 and the second aiming screw 91 pass through the heat sink 11 while avoiding a region (in this exemplary embodiment, a center portion of the back plate 11a) including a position opposite to the light source 21. Although it is difficult to form the heat radiating plate 11e in such a portion, it is possible to minimize deterioration of heat radiation efficiency due to this fact.

In this exemplary embodiment, the first movable frame 15 and the second movable frame 16 serve as an example of a holder holding the projection lens 14. Here, the first movable frame 15 which is an example of a first portion of the holder is displaceable, by the first aiming screw 18, in the first direction (for example, the vertical direction of the vehicle). On the other hand, the second movable frame 16 which is an example of a second portion of the holder is displaceable, by the second aiming screws 91, in the second direction (for example, the lateral direction of the vehicle) independently of the first movable frame 15.

With such a configuration, the adjustment of the reference position of the optical axis in the vertical direction and the adjustment of the reference position of the optical axis in the lateral direction can be carried out completely independently from each other. Since one of the adjustments of the position of the optical axis does not affect the other, it is possible to simplify and speed up the aiming process.

In this exemplary embodiment, the first aiming screw 81 and the drive shaft 17b of the actuator 17 are disposed side by side along the extending direction thereof, that is, along the longitudinal directions. With such a configuration, the shaft portion 81b of the first aiming screw 81 and the drive shaft 17b of the actuator 17 can be as close as possible to each other, and the adjustment of the reference position of the optical axis Ax of the projection lens 14 and the adjustment of the orientation of the optical axis Ax by the leveling control can be performed substantially on the same axis. Therefore, it is possible to reduce the size of the lamp unit 10 as compared with the configuration in which these adjustments are performed on different axes.

In this exemplary embodiment, the shape of the light distribution pattern formed by the light emitted from the same light source 21 is changed according to the position of the movable shade 31. That is, the adjustment of the optical axis of the optical system, which can form plural light distribution patterns, can be performed only by the pair of aiming screws 81, 91.

The exemplary embodiment described above is intended to facilitate understanding of the invention, but does not limit the invention. It is apparent that the invention may be modified and improved without departing from its spirit, and its equivalents are included in the invention.

The light source 21 is not limited to the light emitting diode. A semiconductor light emitting device (an organic EL device, a laser diode, etc.) or a lamp light source (an incandescent lamp, a halogen lamp, a discharge lamp, a neon lamp, etc.) may be used. Also, the reflector 22 may be in any shape so long as at least a part of the light emitted from the light source 21 can pass through the projection lens 14.

The position at which the first aiming screw 81 and the second aiming screws 91 pass through the heat sink 11 is not limited to that described in the exemplary embodiment. The pass-through position may be located in an arbitrary position so long as the reference position of the optical axis Ax of the projection lens can be adjusted in the first direction and the second direction intersecting the first direction and the pass-through position is disposed so as to avoid the region including a position, in the heat sink 11, opposite to the light source 21.

The aiming mechanism configured to adjust the reference position of the optical axis in the first direction and the second direction intersecting the first direction may adopt a known mechanism so long as the first aiming screw 81 and the second aiming screw 91 extend through the heat sink 11. That is, it is not necessary to divide the holder configured to hold the projection lens 14 into the first movable frame 15 and the second movable frame 16 which are displaceable independently in the first direction and the second direction, respectively.

In the case where the first movable frame 15 and the second movable frame 16 are configured to be displaceable independently in the first and second directions, respectively, it is not necessary that the first movable frame 15 be configured to be displaceable so as to tilt the optical axis Ax in the first direction and the second movable frame 16 be configured to be displaceable so as to parallel-move the optical axis Ax in the second direction.

That is, at least one of the first movable frame 15 and the second movable frame 16 may also be displaceable so as to parallel-move the optical axis Ax of the projection lens 14 in corresponding one of the first and second directions. Or, at least one of the first movable frame 15 and the second movable frame 16 may be displaceable so as to tilt the optical axis Ax of the projection lens 14 in corresponding one of the first and second directions.

The configuration that makes it possible to tilt the optical axis Ax and the configuration that makes it possible to parallel-move the optical axis Ax are not limited to those described in the above exemplary embodiment. The configurations may be replaced by a known mechanism such as a rack pinion mechanism.

Figure 11:
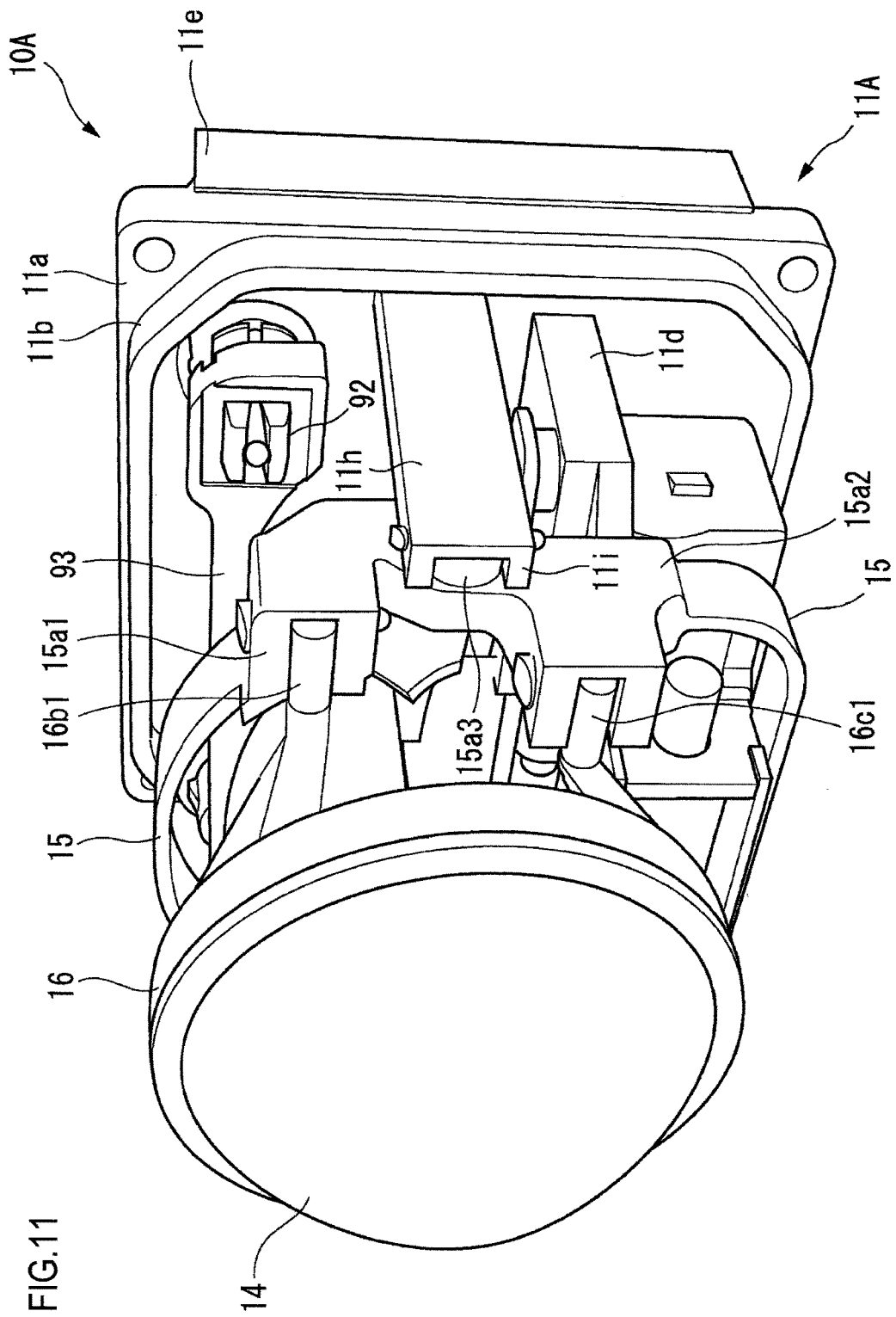
FIG. 11 is a perspective view showing a modified example of the lamp unit.

For example, to support the first movable frame 15 to be rotatable in the vertical direction, the configuration shown in FIG. 11 may be adopted. A lamp unit 10A according to a modified example shown in FIG. 11 is different from the lamp unit 10 described above in that a heat sink 11A directly supports the right rotary shaft 15a3 and the left rotary shaft 15b3 of the first movable frame 15.

Specifically, a pair of support arms 11h extends forward from the inside of the frame portion 11b on the front surface of the back plate 11a of the heat sink 11A. Bearing portions 11i opening to the front and having grooves extending in the lateral directions are formed at front end portions of the support arms 11h. Accordingly, no bearing portion is provided at the left and right end portions of the reflector 22.

The right rotary shaft 15a3 and the left rotary shaft 15b3 of the first movable frame 15 are inserted into the bearing portions 11i of the support arm 11h from the front side, respectively. Although not shown, similarly to the holding member 22d shown in FIG. 1, a holding member is fitted to each front end portion of the support arm 11h from the front side. Thereby, the right rotary shaft 15a3 and the left rotary shaft 15b3 of the first movable frame 15 are prevented from falling off forward.

Figure 12A:
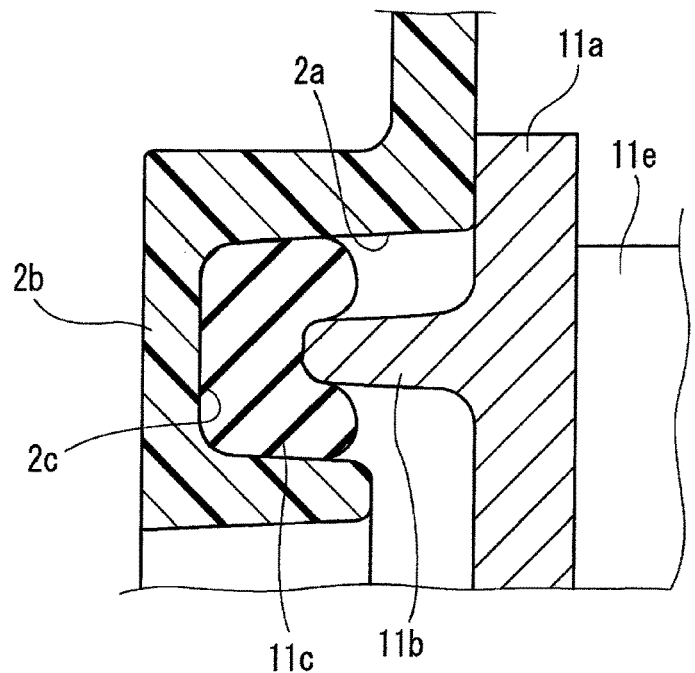
FIGS. 12A and 12B are enlarged partial section views showing modified examples of the lighting apparatus.

The configuration in which the gasket 11c is clamped by the frame portion 2b of the opening 2a of the housing 2 and the frame portion 11b of the heat sink 11 is not limited to one which has been described with reference to FIGS. 1 and 2. For example, as shown in FIG. 12A, a protrusion extending rearward may be provided on an inner edge portion of the frame portion 2b, to thereby form a groove 2c to which the gasket 11c is fitted. In this case, since the lamp unit 10 is mounted from the outside to the housing 2, the gasket 11c received in the groove 2c is pressed by the frame portion 11b (an example of a protrusion).

Figure 12B:
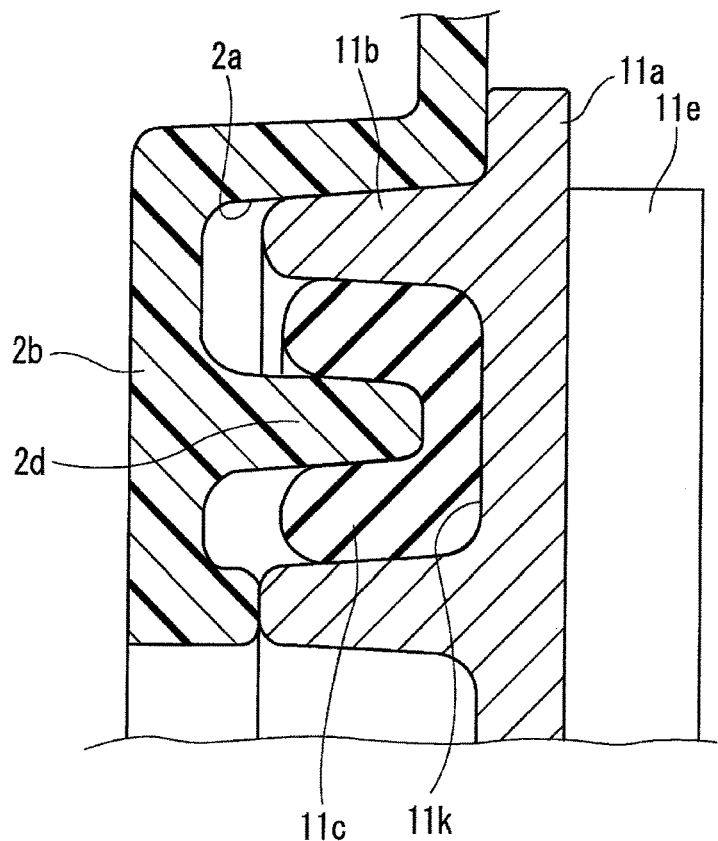

Alternatively, as shown in FIG. 12B, an inner frame extending forward may be provided inside the frame portion 11b of the heat sink 11, to thereby form a groove 11k to which the gasket 11c is inserted. On the other hand, a protrusion 2d extending rearward may be formed on the frame portion 2b of the opening 2a. In this case, since the lamp unit 10 is mounted from the outside to the housing 2, the protrusion 2d presses the gasket 11c received in the groove 11k.

The gasket 11c can be fitted to the groove 2c or the groove ilk in advance when the lamp unit 10 is mounted in the housing 2. Therefore, positional deviation of the gasket 11c does not occur, to thereby improve the mounting workability. Further, since the gasket 11c is held firmly by the groove and protrusion, the seal state is kept well.

The sealing member is not limited to the gasket 11c. A known technique such as an adhesive may be used as the sealing member so long as it can ensure the sealing performance desired for the lamp chamber 3.

It is not necessary that the direction of the optical axis Ax of the projection lens, which is changed by the actuator 17, is a direction corresponding to the vertical direction of the vehicle. For example, the direction of the optical axis Ax of the projection lens may be a direction corresponding to the lateral direction of the vehicle, and the actuator 17 may be used as a swivel actuator rather than the leveling actuator.

If there is no need to form a plurality of light distribution patterns with the single light source 21, the light distribution control unit 13 including the movable shade 31 may be omitted.

The lighting apparatus according to the invention is not limited to the headlamp apparatus 1. The invention may be applicable to any vehicle lighting apparatus so long as they are used in applications that require the adjustment of the optical axis of the projection lens.

What is claimed is:

1. A lighting apparatus configured to be mounted on a vehicle, comprising:
   a housing formed of resin that defines and forms at least a part of a lamp chamber; and
   a lamp unit disposed in the lamp chamber,
   wherein the lamp unit comprises:
   a light source, a reflector comprising:
  a right bearing portion, and
  a left bearing portion,
a heat sink, which is a single rigid piece formed of metal, to which the light source is fixed,
a projection lens through which at least a part of light emitted from the light source passes,
a first moveable frame comprising:
  an upper right bearing portion,
  a lower right bearing portion,
  an upper left bearing portion,
  a lower left bearing portion,
  a right rotary shaft that is inserted in the right bearing portion of the reflector,
  a left rotary shaft that is inserted in the left bearing portion of the reflector, and
  a frame joint member,
a second moveable frame comprising:
  an upper right shaft that is inserted in the upper right bearing portion,
  an upper left shaft that is inserted in the upper left bearing portion,
  a lower right shaft that is inserted in the lower right bearing portion,
  a lower left shaft that is inserted in the lower left bearing portion,
  a lens holder portion connected to the projection lens, and
  a joint protrusion,
a link member comprising a joint portion connected to the joint protrusion of the second moveable frame,
an actuator connected to the frame joint member of the first moveable frame,
a joint member connected to the actuator,
a first screw that extends through the heat sink, that is connected to the joint member, and that has a first manipulation portion, and
a second screw that extends through the heat sink, that is connected to the link member, and that has a second manipulation portion,
wherein a reference position of an optical axis of the projection lens is adjusted in a first direction by manipulating the first manipulation portion,
wherein the reference position of the optical axis of the projection lens is adjusted in a second direction intersecting the first direction by manipulating the second manipulation portion,
wherein at least a portion of the heat sink, in which the first manipulation portion and the second manipulation portion are disposed, is disposed outside the housing, and
wherein the heat sink comprises heat radiating plates that extend vertically, with vertical grooves formed between the heat radiating plates.

2. The lighting apparatus according to claim 1, wherein a plurality of grooves of the vertical grooves extending in a direction corresponding to a vertical direction of the vehicle are formed in a region including a position in the heat sink opposite to the light source, and
the first screw and the second screw pass through the heat sink at positions that avoid the region.

3. The lighting apparatus according to claim 1, wherein the lens holder portion includes
  a first portion that is displaceable in the first direction by the first screw, and
  a second portion that is displaceable in the second direction by the second screw, independently of the first portion.

4. The lighting apparatus according to claim 3, wherein one of the first portion and the second portion is displaceable so as to parallel-move the optical axis in corresponding one of the first direction and the second direction.

5. The lighting apparatus according to claim 4, wherein the other of the first portion and the second portion is displaceable so as to tilt the optical axis in the other of the first direction and the second direction.

6. The lighting apparatus according to claim 3, wherein one of the first portion and the second portion is displaceable so as to tilt the optical axis in corresponding one of the first direction and the second direction.

7. The lighting apparatus according to claim 1, further comprising:
  the actuator including a drive shaft that displaces the optical axis in the first direction, wherein
  the first screw and the drive shaft are disposed side by side along a direction in which the first screw and the drive shaft extend.

8. The lighting apparatus according to claim 7, wherein the first direction is a direction corresponding to a vertical direction of the vehicle.

9. The lighting apparatus according to claim 1, wherein the lamp unit includes a movable shade that changes a shape of a light distribution pattern formed by the light emitted from the light source.

10. The lighting apparatus according to claim 1, wherein a sealing member is clamped between a portion of an outer surface of the housing and a portion of the heat sink that is disposed outside the housing.

11. The lighting apparatus according to claim 10, wherein
  a groove that receives the sealing member is formed one of the portion of the outer surface and the portion of the heat sink, and
  a protrusion that presses the sealing member is formed in the other of the portion of the outer surface and the portion of the heat sink is formed.

12. The lighting apparatus according to claim 1, wherein the heat sink is mounted on the housing.

* * * * *